US007925692B2

(12) United States Patent
Dunagan

(10) Patent No.: US 7,925,692 B2
(45) Date of Patent: Apr. 12, 2011

(54) METHOD AND SYSTEM FOR TESTING INTERNET SOFTWARE

(75) Inventor: Stephen Dunagan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 11/623,127

(22) Filed: Jan. 15, 2007

(65) Prior Publication Data

US 2008/0172575 A1    Jul. 17, 2008

(51) Int. Cl.
*G06F 13/00*    (2006.01)
(52) U.S. Cl. ........................................................ 709/203
(58) Field of Classification Search ................ 703/21, 703/22, 13; 709/223, 203; 717/124, 134, 717/135
See application file for complete search history.

(56) References Cited

U.S. PATENT DOCUMENTS

| | | | |
|---|---|---|---|
| 5,907,696 A | 5/1999 | Stilwell et al. | |
| 6,522,995 B1 | 2/2003 | Conti et al. | |
| 6,687,748 B1 | 2/2004 | Zhang et al. | |
| 6,889,160 B2 | 5/2005 | Sabiers et al. | |
| 2004/0115609 A1 | 6/2004 | Cho | |
| 2004/0127212 A1 | 7/2004 | Wang | |
| 2006/0149524 A1 | 7/2006 | Kalyanaraman et al. | |
| 2006/0224375 A1 | 10/2006 | Barnett et al. | |
| 2007/0208551 A1 * | 9/2007 | Herro .............................. | 703/13 |

FOREIGN PATENT DOCUMENTS

| | | |
|---|---|---|
| EP | 0910194 A2 | 4/1999 |
| WO | 0110082 A2 | 2/2001 |
| WO | 0219060 A2 | 3/2002 |

OTHER PUBLICATIONS

Danzig et al., "An Empirical Workload Model for Driving Wide-Area TCP/IP Network Simulations", Comp. Sci. Dept., USC, http://www.kiskeya.net/ramon/work/pubs/jinet92.pdf; pp. 1-29.
Banga et al,, "Measuring the Capacity of a Web Server under Realistic Loads", Comp. Sci, Dept., Rice University, Houston, Texas, vol. 2, Nos. 1-2 (Jun. 1999). http://www.springerlink.com/content/j0588u011224q464/, 3 pages.
Carter et al., "On the Network Impact of Dynamic Server Selection", Comp. Sci. Dept., Boston University, Boston, MA; Computer Networks 31 (1999) 2529-2558; http://www.cs.bu.edu/faculty/crovella/paper-archive/dss-journal.pdf.
Filey, George F., "The Georgia Tech Network Simulator", Georgia Institute of Technology, School of Elec. and Comp. Eng., Atlanta, GA, Proceedings of the ACM SIGCOMM 2003 Workshops (Aug. 2003) pp. 5-12.

* cited by examiner

*Primary Examiner* — Robert B Harrell
(74) *Attorney, Agent, or Firm* — Merchant & Gould PC

(57) ABSTRACT

A simulated internet is connected to a corporate network to more easily and effectively facilitate testing the impact of internet security devices and settings on internet software. The simulated internet has communications pathways between two firewall devices, a web proxy and a publishing firewall, that also protect the corporate network. A test web server on the corporate network is published to the simulated internet by the publishing firewall through reverse proxy as a unique internet name that only exists on the simulated internet One or more test client machines on the corporate network are configured to use the forward proxy firewall of the corporate web proxy to access the unique internet name. With this configuration all the pieces are in place for what the Internet does, except the simulated internet is a private internet under the control of the software tester.

18 Claims, 7 Drawing Sheets

METHOD AND SYSTEM FOR TESTING INTERNET SOFTWARE

BACKGROUND

New software products that communicate over the Internet must consider the impact of various types of internet security devices and software, such as firewalls. Common test procedures dictate establishment of one or more private networks under the control of the software developer that are connected to the Internet and to each other, but not to the software developer's corporate network due to security issues and concerns. These extranets require additional hardware and specialized procedures to maintain and implement the test environment, and by definition, normal access procedure for product deployment, testing and debugging do not apply. During the development of internet software there are many cycles of code, compile, deploy, test, debug, fix, and repeat. Typically, all development processes are based on access to the software developer's corporate network. In utilizing the extranets the deployment and testing of the internet software is quite challenging, and debugging becomes nearly impossible on the separate extranets.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In order to improve upon the testing of internet software, a private network that acts like the Internet, referred to as a simulated internet, is configured with communications paths between two firewall devices, one a web proxy, and the other a publishing firewall, that at the same time are also protecting the corporate network. A domain name server provides name resolution for servers connected to the simulated internet. A test web server on the corporate network is published to the simulated internet by the publishing firewall (also know as reverse proxy) as a unique domain or internet name that only exists on the simulated internet. One or more test client machines on the corporate network are configured to use the test web proxy to access the unique internet name. With this configuration all the pieces are in place for what the Internet does, except the simulated internet is a private network under the control of the software developer. All communications protocol rules that apply to the Internet also apply to the simulated internet, but the tester now has full control over all components of the test environment. This approach eliminates the need for additional hardware and software deployments, and facilitates standard test and debugging procedures. The advantage of such a testing environment is that the simulated internet allows the testers to utilize the same server and test client machines normally used to test direct network connections and multiple Internet connection environments by simply manipulating a few settings in the test client machines and using an appropriate domain name for the target server.

DETAILED DESCRIPTION

Figure 1:
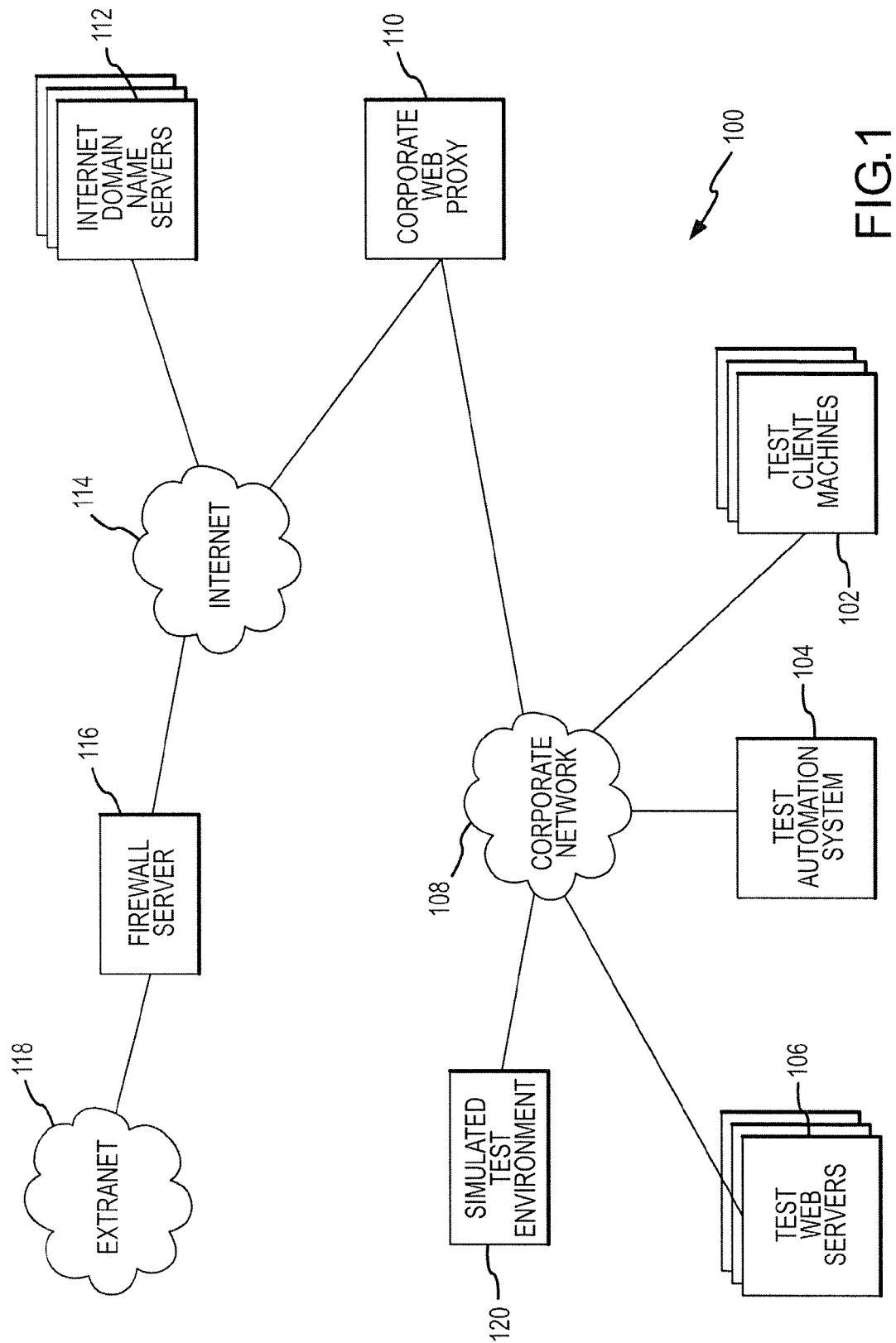
FIG. 1 shows a schematic/block diagram of a testing environment utilized by a software developer for testing internet software.

Referring now to the Figures, in which like reference numerals and names refer to structurally and/or functionally similar elements thereof, FIG. 1 shows a schematic/block diagram of a testing environment utilized by a software developer for testing internet software. In the figures, connections allowing communication between networks and devices are shown as solid lines. Specific transaction or communication paths are shown as solid lines with arrows. Referring now to FIG. 1 and Testing Environment 100, one or more private networks such as Extranet 118 under the control of the software developer are established in order to perform testing on new and existing software products that communicate over the Internet 114. Extranet 118 is connected to Internet 114 but not directly to the software developer's Corporate Network 108.

Test Automation System 104 controls the configuration and assignment of test machine resources, execution of specific test cases, and the collection of test case results for later analysis. Test Automation System 104 is designed to function within the controlled corporate environment where it has complete control of all machine resources. When the targeted test web server(s) reside in a separate network, such as Extranet 118 that can only be accessed via Internet 114, Test Automation System 104 looses direct control of these server machines. Workarounds to address this type of testing environment create instability in the controlled test environment of Test Automation System 104, and some Internet security settings may not be testable due to corporate security policies implemented on Corporate Web Proxy 110. Therefore, Testing Environment 100 also includes Simulated Test Environment 120 (explained more fully in respect to FIG. 2) which bypasses the use of Corporate Web Proxy 110 and allows Test Automation System 104 to maintain direct control over the test procedures.

Internet security has two main roles: allow users to safely access internet computers (via a forward proxy), and allow users to safely publish specific computers for internet access (via a reverse proxy). Most internet security products incorporate features of these two roles into a firewall service. The majority of communication directly on the Internet is between firewall devices/firewall software that are protecting anywhere from one to hundreds or thousands of computers.

In order for Test Client Machines 102 to access servers on Internet 114, Test Client Machines 102 would connect through Corporate Network 108 to Corporate Web Proxy 110

(forward proxy), requesting a URL. Corporate Web Proxy 110 takes over the task and creates a DNS request to find the location of the target server, and sends it over Internet 114. Internet Domain Name Servers 112 provide the location information requested, which may be the internet address of Firewall Server 116 (see description of FIG. 3 below). Corporate Web Proxy 110 then makes a connection to the target server, submits the URL request and returns the requested web page to Test Client Machines 102.

Firewall Server 116 protects Extranet 118 from requests that come from Internet 114. Extranet 118 is a separate network that is not connected to Corporate Network 108, but is maintained by the software developer to host test servers. Extranet 118 will typically contain web servers, email servers, and so forth (not shown). Firewall Server 116 defines the types of requests from Internet 114 that are allowed to the target servers in Extranet 118. However, corporate IT security policies may dictate network traffic filters that prevent the testing of some internet protocols and firewall features.

Figure 2:
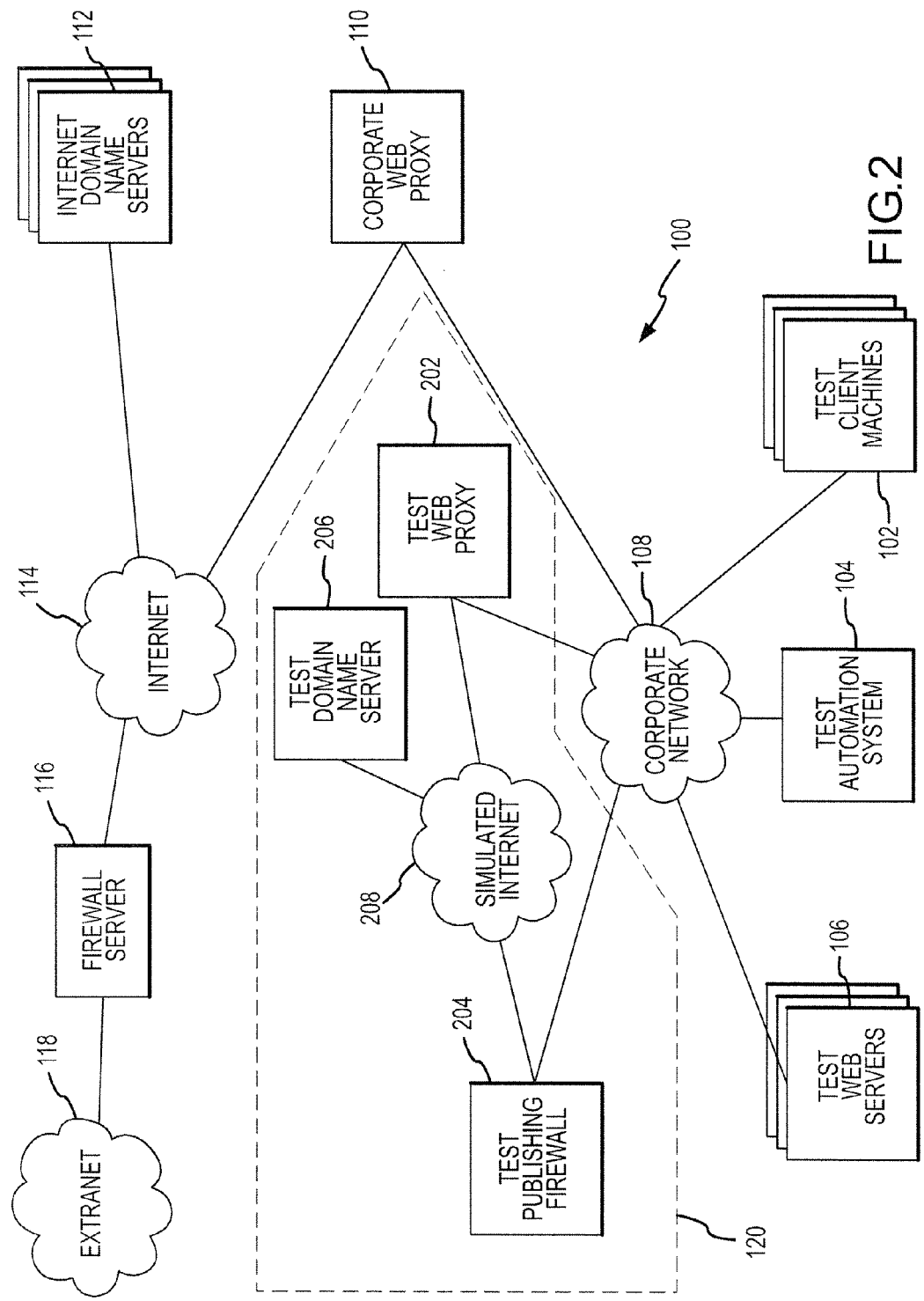
FIG. 2 shows a schematic/block diagram of the testing environment of FIG. 1 with an expanded view of the simulated test environment for testing internet software.

FIG. 2 shows a schematic/block diagram of the testing environment of FIG. 1 with an expanded view of the simulated test environment for testing internet software. Referring now to FIG. 2, Simulated Test Environment 120 has a Test Web Proxy 202 (forward proxy), Test Publishing Firewall 204 (reverse proxy), and Test Domain Name Server 206 which are connected to form Simulated Internet 208. Test Web Proxy 202 and Test Publishing Firewall 204 are shown as dual-homed in that they are also connected to Corporate Network 108, and Test Domain Name Server 206 is not. However, Test Domain Name Server 206 could be configured as dual-homed to allow automated control of Domain Name to IP address entries. Test Domain Name Server 206 will only function on the connection to Simulated Internet 208, and provides name resolution for servers connected to Simulated Internet 208. Test Domain Name Server 206 may be configured to run as a Dynamic Host Configuration Protocol ("DHCP") server to automatically provide internet addresses to any additional devices attached to Simulated Internet 208. The domain and server names of Test Domain Name Server 206 may be controlled manually or via scripted commands.

Test Publishing Firewall 204 is connected so that the protected network is Corporate Network 108 and the public connection is to Simulated Internet 208. Rules are created on Test Publishing Firewall 204 to allow Test Web Servers 106 to be accessed on Simulated Internet 208.

Test Web Proxy 202 is connected so that the protected network is Corporate Network 108 and the public connection is to Simulated Internet 208. Rules are created on Test Web Proxy 202 to allow Test Client Machines 102 to access servers published to Simulated Internet 208.

Simulated Internet 208 is a private internet with communications paths between the two firewall devices (Test Web Proxy 202 and Test Publishing Firewall 204) that are also protecting Corporate Network 108. For a small testing network, Simulated Internet 208 may simply have a small network switch or hub. For a larger testing network, Simulated Internet 208 may require multiple switches and\or routers.

Test Web Servers 106 on Corporate Network 108 are published to Simulated Internet 208 by Test Publishing Firewall 204 using reverse proxy or network address translation ("NAT") as a unique internet name that only exists on Simulated Internet 208. One or more of Test Client Machines 102 are configured to use Test Web Proxy 202 to access servers on Simulated Internet 208. All communications protocol rules apply to Simulated Internet 208 that apply to Internet 114.

The uniqueness of Testing Environment 200 is that the addition of Simulated Test Environment 120 having Test Web Proxy 202 and Test Publishing Firewall 204, which are connected to private Simulated Internet 208, provides the software developer the ability to create and fully control an "Internet Test Environment" using existing hardware resources of the developer. Corporate IT security policies are not violated since in this embodiment there is no use of Corporate Web Proxy 110 and a connection to an external network. Simulated Test Environment 120 can be controlled by Test Automation System 104, allowing the software developer to utilize existing test automation scripts, with minor modifications, or design new automated tests using current tools and techniques.

Figure 3:
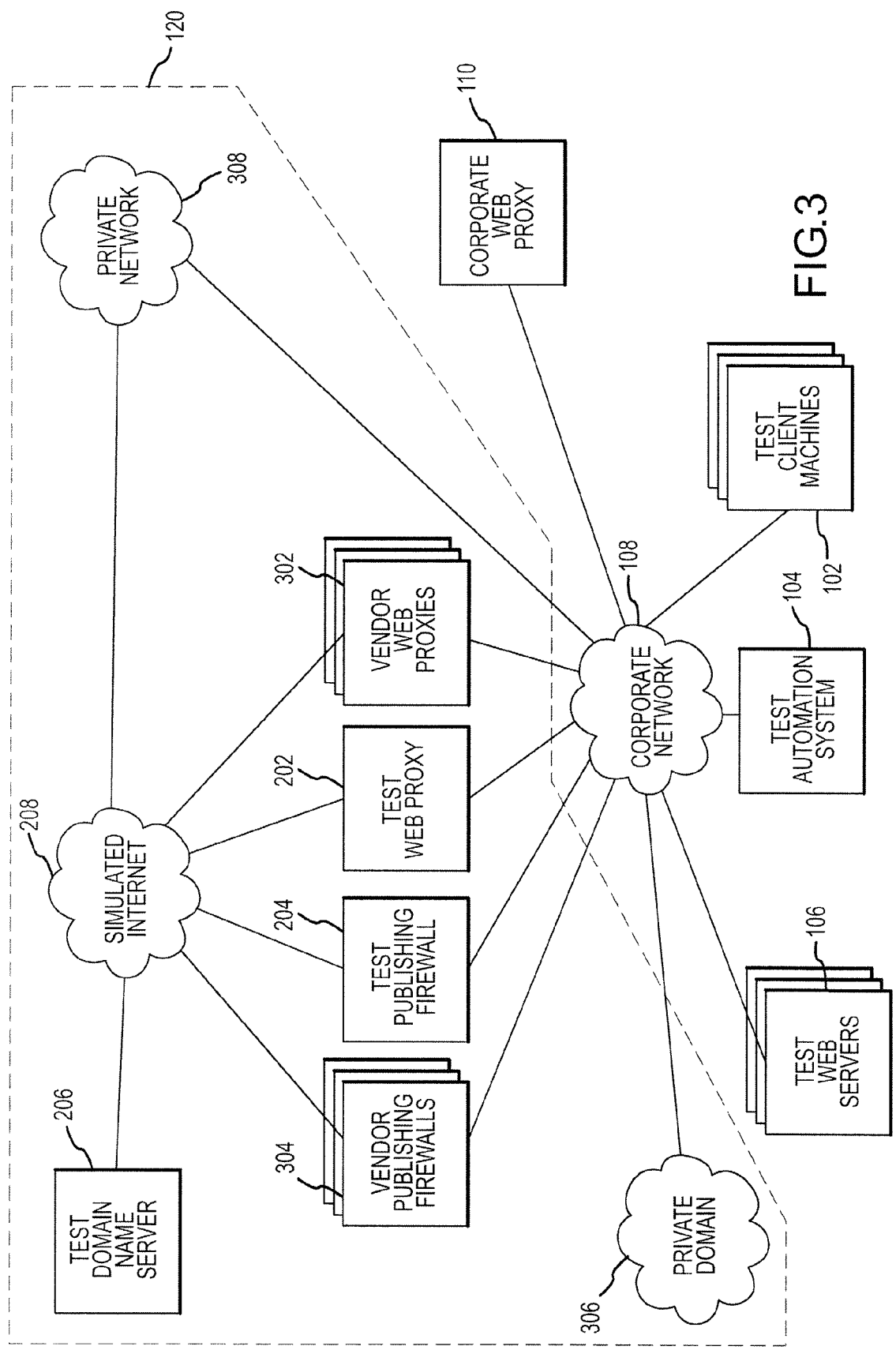
FIG. 3 shows a schematic/block diagram of an embodiment of the simulated test environment having third party firewall and proxy hardware/software for testing internet software.

FIG. 3 shows a schematic/block diagram of an embodiment of the simulated test environment having third party firewall and proxy hardware/software for testing internet software. Referring now to FIG. 3, it is shown that Simulated Test Environment 120 could be expanded to allow testing of internet software interactions with security devices and/or firewalls from different third party vendors (Vendor Web Proxies 302 and Vendor Publishing Firewalls 304). Additional optional connections to one or more Private Domain 306 and one or more internal Private Network 308 are also shown that may also be utilized in testing. Many other such configurations are possible, and the ones shown here are merely exemplary of the many such configurations that would suggest themselves to one skilled in the art. The configurations shown are not to be interpreted as limiting the scope of the invention.

Figure 4:
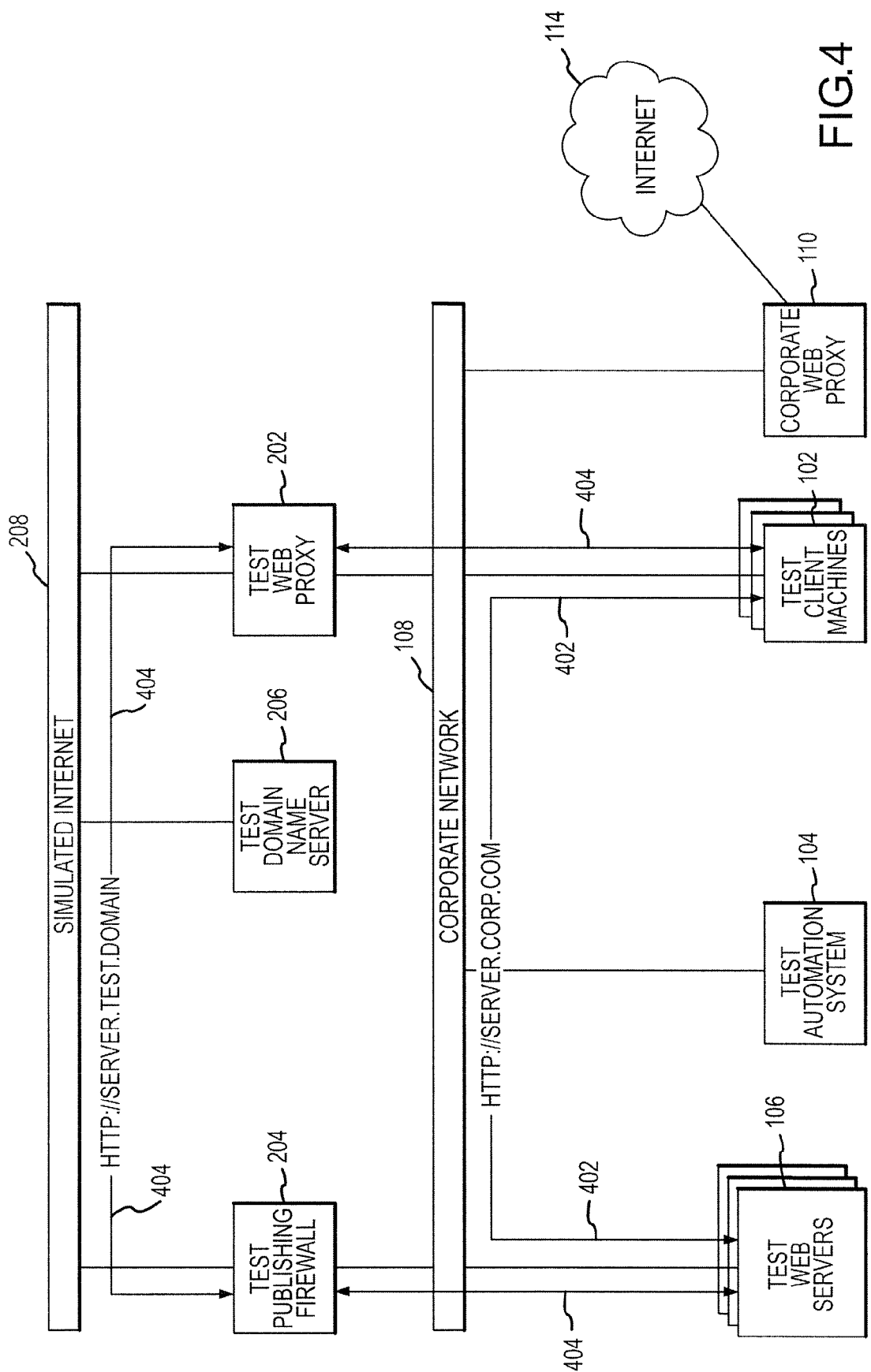
FIG. 4 shows a schematic/block diagram of the data paths and how traffic flows in the simulated test environment of FIG. 2.

FIG. 4 shows a schematic/block diagram of the data paths and how traffic flows in the simulated test environment of FIG. 2. Referring now to FIG. 4, Test Web Proxy 202 allows access to private domain names on Simulated Internet 208. Test Publishing Firewall 204 contains rules that allow Test Web Servers 106 to be accessed from Simulated Internet 208. Test Automation System 104 controls task execution on all test systems on Corporate Network 108 and Simulated Internet 208. For instance, within Corporate Network 108 a Test Web Server 106 may be named http://server.corp.com). Then when a Test Client Machine 102 connects to http://server.corp.com, the Transaction Path 402 uses Corporate Network 108 to access Test Web Servers 106 and the response comes back along the same Transaction Path 402.

For testing on Simulated Internet 208, a Test Web Server 106 named http://server.corp.com is published to Simulated Internet 208 as http://server.test.domain. When one or more Test Client Machines 102 connect to http://server.test.domain the Transaction Path 404 goes through Test Web Proxy 202 and uses Simulated Internet 208, through Test Publishing Firewall 204 to access Test Web Servers 106 and the response comes back along the same Transaction Path 404.

Test Automation System 104 can run a suite of tests utilizing Transaction Path 402 and then run the same tests using Transaction Path 404 and compare the results. Additional testing may focus on modifying the configuration of Test Web Proxy 202, Test Publishing Firewall 204, or Test Web Servers 106 between test runs.

Figure 5:
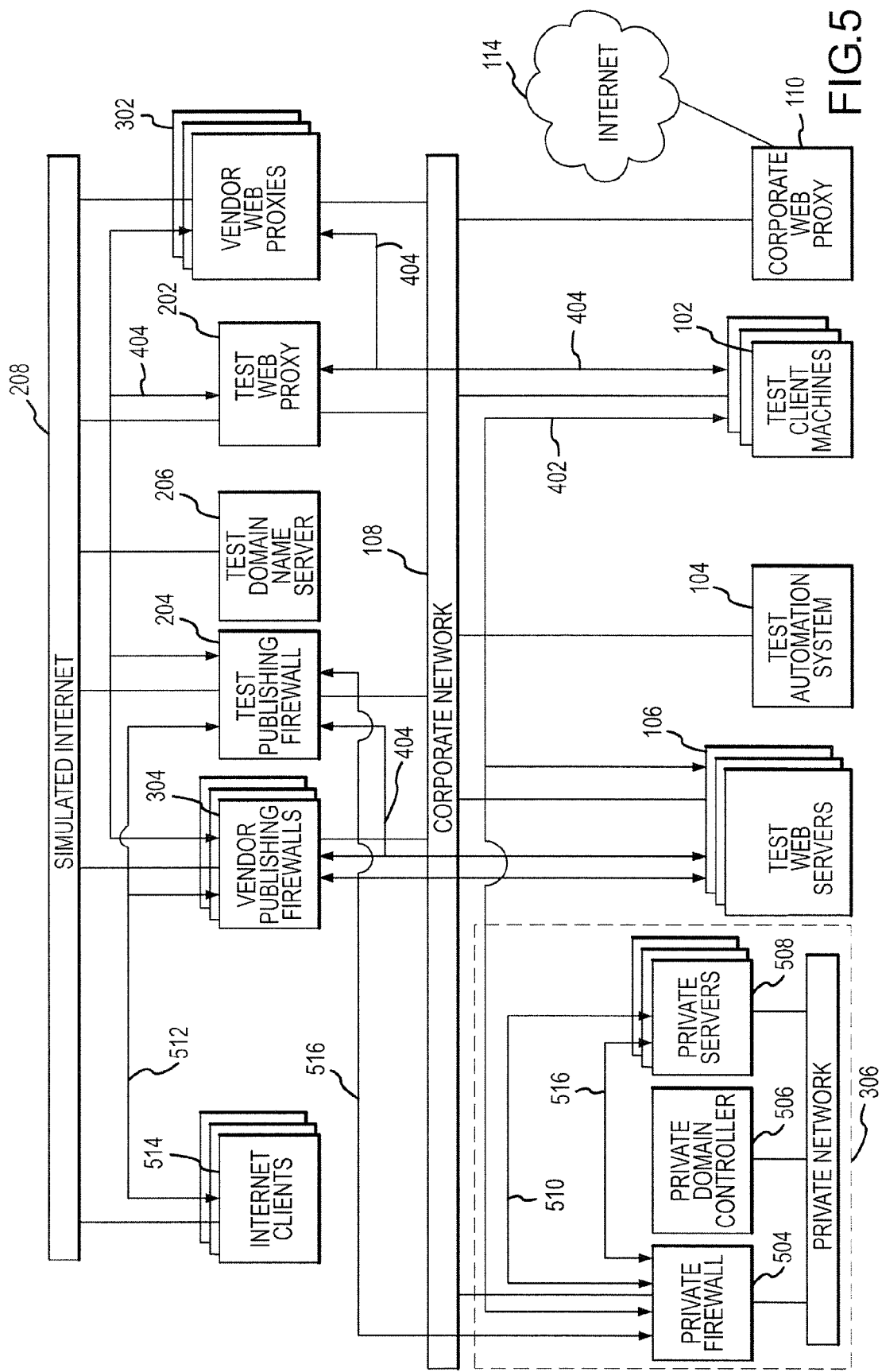
FIG. 5 shows a schematic/block diagram of the additional data paths and how traffic flows in the simulated test environment of FIG. 3.

FIG. 5 shows a schematic/block diagram of the additional data paths and how traffic flows in the simulated test environment of FIG. 3. Referring now to FIG. 5, Private Domain 306 which is connected to Corporate Network 108 may have Private Firewall 504, Private Domain Controller 506, and Private Servers 508. Private Domain 306 can publish its Private Servers 508 to Corporate Network 108. Transaction Path 510 is comparable to Transaction Path 402 of FIG. 4. Transaction Path 404 may be extended to encompass Vendor Publishing Firewalls 304 and Vendor Web Proxies 302.

Internet Clients 514 are connected directly to Simulated Internet 208. Transaction Path 512 from Internet Clients 514 may be channeled through either Vendor Publishing Firewalls 304 or Test Publishing Firewall 204 to reach Private Servers 508 published by Private Firewall 504 via Transaction Path 516. Test Web Servers 106 may also be accessed by Internet Clients 514 through Transaction Path 512 to Vendor Publishing Firewalls 304 or Test Publishing Firewall 204 via Transaction Path 404 or part of Transaction Path 516 external to Private Domain 306. Private Servers 508 may also be accessed by Test Client Machines 102 through an extension of Transaction Path 402 and part of Transaction Path 516 internal to Private Domain 306.

Figure 6:
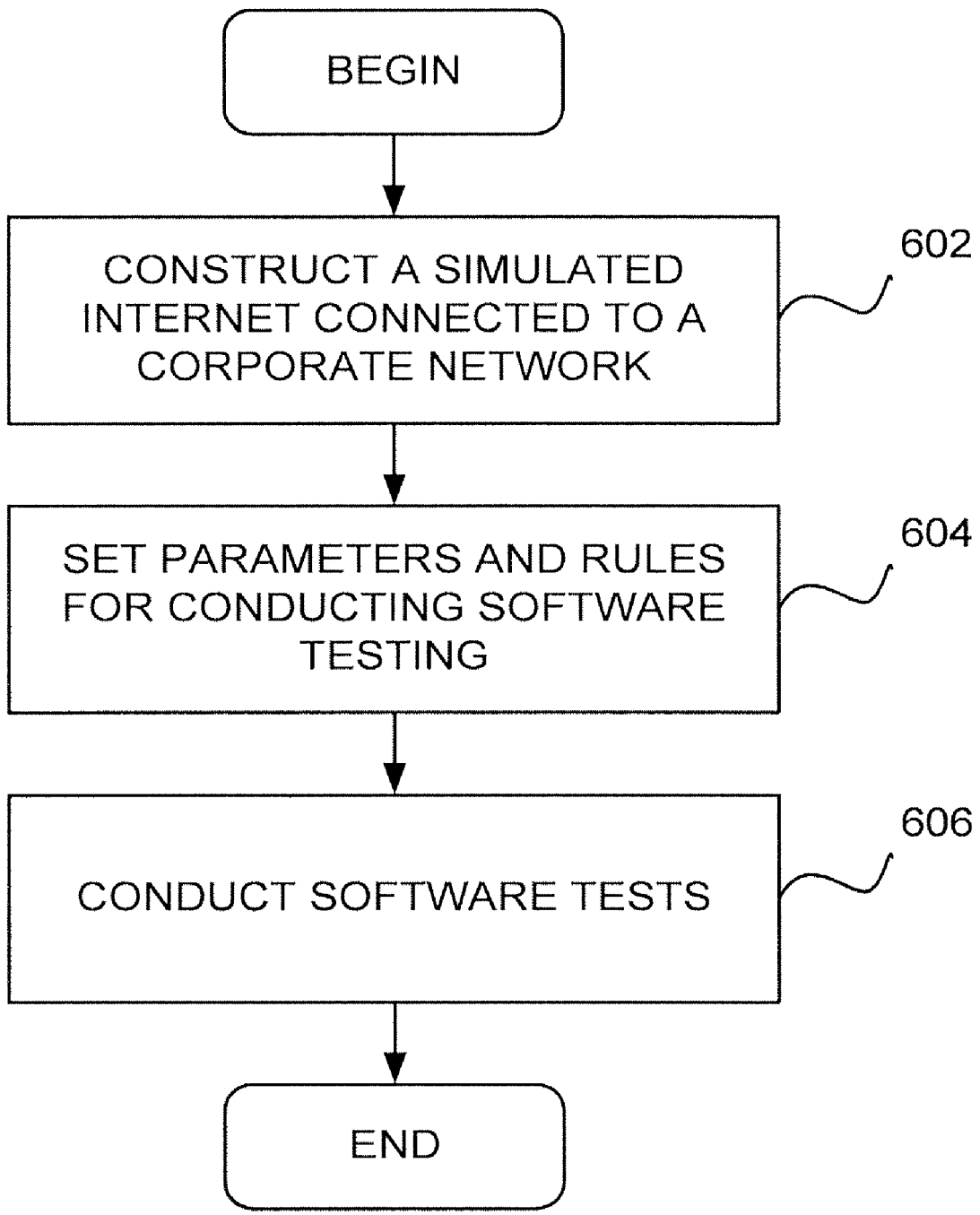
FIG. 6 shows a block flow diagram of an embodiment of a method of testing internet software utilizing a simulated internet.
Figure 7:
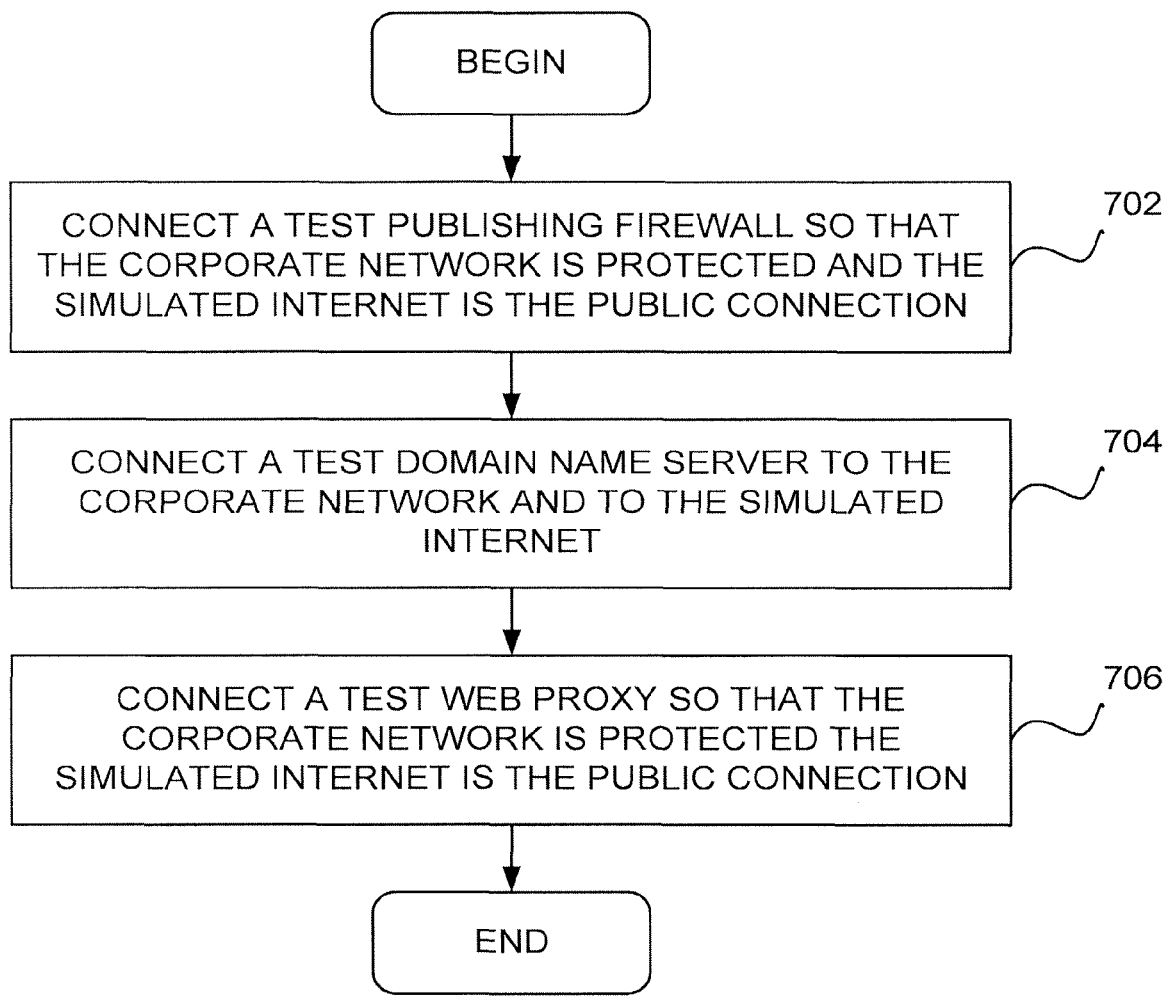
FIG. 7 shows a block flow diagram of an embodiment of setting up a simulated internet connected to a corporate network.

FIG. 6 shows a block flow diagram of an embodiment of a method of testing internet software utilizing a simulated internet. Referring now to FIG. 6, the method begins in step 602 by constructing Simulated Internet 208 that is connected to a Corporate Network 108. The details of this step are shown in FIG. 7 which shows a block flow diagram of an embodiment of setting up a simulated internet connected to a corporate network. Referring now to FIG. 7, in step 702 Test Publishing Firewall 204 is connected so that the protected network is Corporate Network 108 and the public connection is to the network switch or hub of Simulated Internet 208.

Next, in step 704 a Test Domain Name Server 206 is connected to Corporate Network 108 via the network switch or hub of Simulated Internet 208. DNS service of Test Domain Name Server 206 will only function on the connection to Simulated Internet 208. The connection to Corporate Network 108 via Simulated Internet 208 is used for remote control or automated creation of DNS entries.

Test Web Proxy 202 is connected in step 706 so that the protected network is Corporate Network 108 and the public connection is to the network switch or hub of Simulated Internet 208.

Referring back now to FIG. 6, in step 604 parameters are set for the particular testing environment. DNS records are used to create unique DNS Domains and server names in those domains required for the particular testing to be done. The simplest implementation is a "Wild Card" DNS entry that associates all server names with a single address on Simulated Internet 208. Internet proxy settings can be configured on Test Client Machines 102 to use a Proxy Automated Configuration (PAC) script to resolve server names for connection. Rules are created on Test Publishing Firewall 204 or Vendor Publishing Firewalls 304 to allow Test Web Servers 106 of Corporate Network 108 to be accessed from Simulated Internet 208. Rules are also created on Test Web Proxy 202 or Vendor Web Proxies 302 to allow internal Test Client Machines 102 to access servers that are published to Simulated Internet 208.

In step 606 the software tests are conducted utilizing Simulated Internet 208 and Corporate Network 108. Test Automation System 104 of Corporate Network 108 controls and runs suites of automated tests against the internet software to be tested, such as client software or server software. Test Automation System 104 has a centralized database of scripted instructions to accomplish a testing task. At the conclusion of the testing, the method ends. However, steps 604 and 606 can be repeated for additional tests on the same software, or, new software can be tested instead.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications of the invention will suggest themselves without departing from the scope of the present invention.

What is claimed is:

1. A system for conducting tests on internet software, the system comprising:
   a corporate network, said corporate network further comprising;
      at least one test web server;
      a test automation system for controlling the testing; and
      at least one test client machine;
   a simulated internet connected to said corporate network, said simulated internet further comprising;
      a test web proxy having a connection to said corporate network;
      a test publishing firewall having a connection to said corporate network; and
      a test domain name server;
   wherein said at least one test web server on said corporate network is published to said simulated internet by said test publishing firewall through reverse proxy as a first domain name that only exists on said simulated internet, wherein said at least one test client machine through said test web proxy and said test domain name server can access said at least one test web server via said simulated internet through said first domain name.

2. The system according to claim 1 further comprising:
   a first transaction path used for conducting the tests on the internet software, wherein said first transaction path goes from said at least one test client machine through said corporate network to said test web proxy to said simulated internet and through said test publishing firewall to said at least one test web server when said at least one test client machine requests said first domain name for said at least one test web server.

3. The system according to claim 2 further comprising:
   a second domain name for said at least one test web server used within said corporate network; and
   a second transaction path used for conducting the tests on the internet software, wherein said second transaction path goes from said at least one test client machine through said corporate network to said at least one test web server when said at least one test client machine requests said second domain name for said at least one test web server.

4. The system according to claim 3 wherein said simulated internet further comprises:
   at least one additional vendor web proxy; and
   at least one additional vendor publishing firewall;
   wherein said first transaction path is extended to include said at least one additional vendor web proxy and said at least one additional vendor publishing firewall to access said at least one test web server.

5. The system according to claim 4 further comprising:
   a private domain connected to said corporate network, said private domain further comprising;
      a private firewall;
      a private domain controller; and
      at least one private server;
      wherein said second transaction path is extended to said private firewall to access said at least one private server over a third transaction path between said private firewall and said at least one private server.

6. The system according to claim 5 further comprising:
   at least one internet client connected directly to said simulated internet;

a third transaction path that goes from said at least one internet client to either of said vendor publishing firewall or said test publishing firewall; and a fourth transaction path that goes from said vendor publishing firewall or said test publishing firewall to said private firewall and on to said at least one private server;

wherein said at least one internet client accesses said at least one private server through said third transaction path and said fourth transaction path to conduct the tests on the internet software.

7. The system according to claim 5 further comprising:

at least one internet client connected directly to said simulated internet; and a third transaction path that goes from said at least one internet client to either of said vendor publishing firewall or said test publishing firewall;

wherein said at least one internet client accesses said at least one test web server through said third transaction path and said first transaction path to conduct the tests on the internet software.

8. The system according to claim 3 further comprising:

a suite of tests run by said test automation system, wherein said suite of tests is first run on said first transaction path, and then said suite of tests is run on said second transaction path, wherein a results of said suite of tests run on said first transaction path and said second transaction path are compared.

9. The system according to claim 1 further comprising:

at least one test automation script executed by said test automation system for conducting the tests on the internet software.

10. A computer-implemented method for conducting tests on internet software, the method comprising the steps of:

(a) constructing a simulated internet, wherein the constructing comprises connecting a test web proxy and a test publishing firewall and a test domain name server together to form said simulated internet so that said test web proxy and said test publishing firewall are dual-homed between said simulated internet and a corporate network, and said test domain name server is connected only to said simulated internet;

(b) connecting said simulated internet to said corporate network;

(c) publishing by said test publishing firewall a test web server on said corporate network to said simulated internet with a first domain name for said test web server that only exists on said simulated internet;

(d) configuring at least one test client machine on said corporate network to use said test web proxy to access said test web server via said first domain name;

(e) setting parameters and rules for conducting the tests; and (f) conducting the tests on the internet software utilizing said simulated internet and said corporate network.

11. The computer-implemented method according to claim 10 further comprising the steps of:

providing a second domain name for said test web server that only exists on said corporate network;

configuring said at least one test client machine on said corporate network to access said test web server via said second domain name; and conducting the tests on the internet software under the control of said test automation system through said corporate network.

12. The computer-implemented method according to claim 11 further comprising the step of:

comparing a results of conducting the tests utilizing said first domain name with a results of conducting the tests utilizing said second domain name.

13. A computer-implemented method for conducting tests on internet software, the method comprising the steps of:

(a) configuring a simulated internet that acts like the Internet with communication paths between a test web proxy and a test publishing firewall that both protect a corporate network;

(b) providing domain name resolution for servers connected to said simulated internet;

(c) publishing by said test publishing firewall at least one test web server on said corporate network to said simulated internet with a first domain name for said at least one test web server that only exists on said simulated internet;

(d) configuring at least one test client machine to use said test web proxy to access said at least one test web server via said first domain name; and (e) conducting the tests on the internet software under the control of a test automation system on said corporate network through said simulated internet.

14. The computer-implemented method according to claim 13 wherein said configuring step (a) further comprises the steps of:

configuring said test publishing firewall so that its protected connection is to said corporate network and its public connection is to said simulated internet; and configuring said test web proxy so that its protected connection is to said corporate network and its public connection is to said simulated internet.

15. The computer-implemented method according to claim 13 further comprising the steps of:

creating rules on said test publishing firewall to allow said at least one test web server to be accessed on said simulated internet; and creating rules on said test web proxy to allow said at least one test client machine to access said at least one test web server published to said simulated internet.

16. The computer-implemented method according to claim 13 wherein said conducting step (e) further comprises the step of:

configuring said test automation system to control conducting the tests utilizing at least one automation script.

17. The computer-implemented method according to claim 13 further comprising the steps of:

providing a second domain name for said at least one test web server that only exists on said corporate network;

configuring said at least one test client machine to use said test web proxy to access said at least one test web server via said second domain name; and conducting the tests on the internet software under the control of said test automation system on said corporate network through said corporate network.

18. The computer-implemented method according to claim 13 wherein said conducting step (e) further comprises the step of:

comparing a results of conducting the tests on the internet software utilizing said first domain name with a results of conducting the tests on the internet software utilizing said second domain name.

* * * * *